US009185887B2

(12) United States Patent
Suazo Luengo

(10) Patent No.: US 9,185,887 B2
(45) Date of Patent: Nov. 17, 2015

(54) AQUACULTURE NET WITH ISOTROPIC BOTTOM MESH

(71) Applicant: NV BEKAERT SA, Zwevegem (BE)

(72) Inventor: Alejandro Suazo Luengo, Talcahuano (CL)

(73) Assignee: NV BEKAERT SA, Zwevegem (BE)

( * ) Notice: Subject to any disclaimer, the term of this patent is extended or adjusted under 35 U.S.C. 154(b) by 0 days.

(21) Appl. No.: 14/351,031

(22) PCT Filed: Sep. 27, 2012

(86) PCT No.: PCT/EP2012/069097
§ 371 (c)(1),
(2) Date: Apr. 10, 2014

(87) PCT Pub. No.: WO2013/053603
PCT Pub. Date: Apr. 18, 2013

(65) Prior Publication Data
US 2014/0251226 A1 Sep. 11, 2014

(30) Foreign Application Priority Data

Oct. 13, 2011 (EP) .................................. 11185003

(51) Int. Cl.
*A01K 61/00* (2006.01)
*B21F 27/02* (2006.01)

(52) U.S. Cl.
CPC ............... *A01K 61/007* (2013.01); *B21F 27/02* (2013.01)

(58) Field of Classification Search
CPC ...... A01K 61/00; A01K 61/007; B21F 27/00; B21F 27/005; B21F 27/08

USPC ............. 119/223, 239, 226, 228; 140/7; 43/7, 43/11, 12, 14; 245/3, 7, 8, 10
See application file for complete search history.

(56) References Cited

U.S. PATENT DOCUMENTS

| | | | | |
|---|---|---|---|---|
| 2,894,366 | A * | 7/1959 | Leckie | 57/233 |
| 4,615,301 | A * | 10/1986 | Maekawa et al. | 119/223 |
| 5,617,813 | A * | 4/1997 | Loverich et al. | 119/223 |
| 6,065,239 | A * | 5/2000 | Thomas et al. | 43/4.5 |
| 8,210,125 | B2 * | 7/2012 | Vidal Rudloff et al. | 119/223 |
| 8,302,564 | B2 * | 11/2012 | Vidal Rudloff | 119/223 |
| 8,336,499 | B2 * | 12/2012 | Kunz Astete et al. | 119/223 |
| 8,534,227 | B2 * | 9/2013 | Coffin et al. | 119/201 |
| 2008/0202441 | A1 * | 8/2008 | Kunz Astete et al. | 119/201 |
| 2009/0229531 | A1 * | 9/2009 | Stillman | 119/215 |
| 2010/0319625 | A1 | 12/2010 | Vidal Rudloff | |
| 2011/0048331 | A1 * | 3/2011 | Vidal Rudloff et al. | 119/226 |
| 2011/0114028 | A1 * | 5/2011 | Coffin et al. | 119/201 |
| 2014/0252173 | A1 * | 9/2014 | Suazo Luengo et al. | 245/10 |

FOREIGN PATENT DOCUMENTS

| | | |
|---|---|---|
| EP | 2 335 477 A1 | 6/2011 |
| JP | 52-122597 A | 10/1977 |
| JP | 55-138345 A | 10/1980 |

* cited by examiner

*Primary Examiner* — Trinh Nguyen
(74) *Attorney, Agent, or Firm* — Foley & Lardner LLP

(57) ABSTRACT

Aquaculture net (30) having a bottom net (31) and side walls (32), said bottom net (31) configured of four or more mesh parts (34) of a chain link fence, said chain link fence comprising a wire direction (33) and a flexible direction, wherein the wire direction of each mesh part (34) is perpendicular to the outer side (36) of said mesh part, said outer side corresponding to the circumference of said bottom net, and wherein the outer sides of said mesh parts are knotted. The invention also provides a method for manufacturing such an aquaculture net.

17 Claims, 4 Drawing Sheets

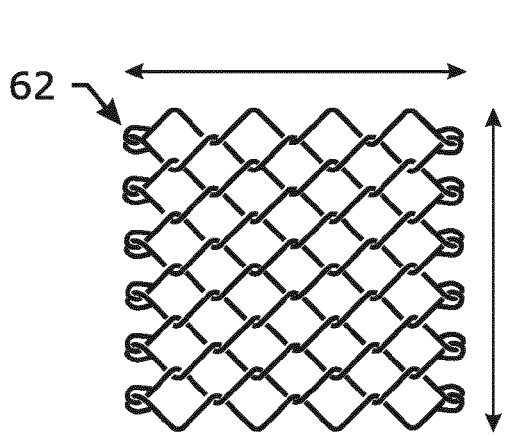
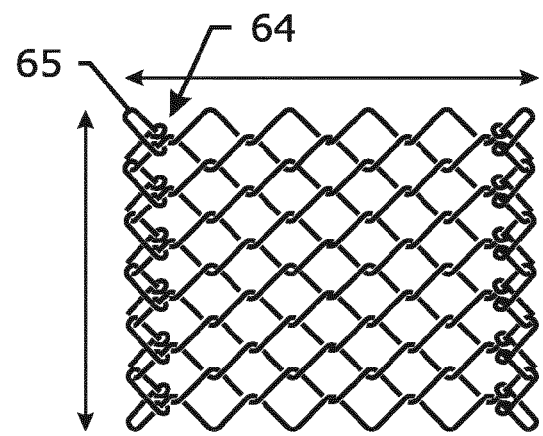
Fig. 6a    Fig. 6b
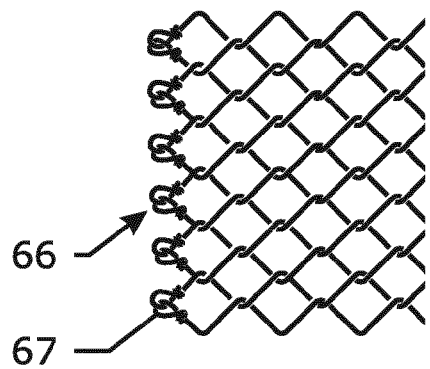
Fig. 6c
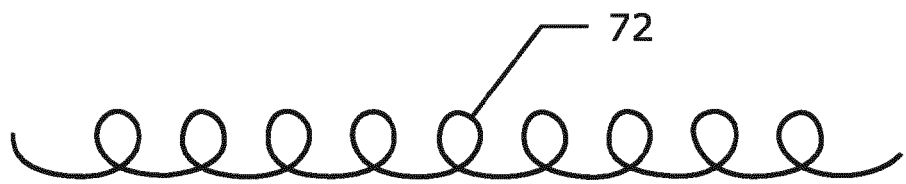
Fig. 7a
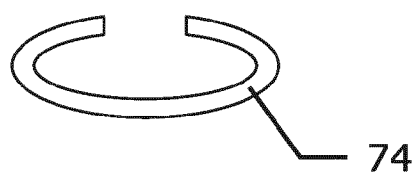
Fig. 7b

AQUACULTURE NET WITH ISOTROPIC BOTTOM MESH

TECHNICAL FIELD

The invention relates to an aquaculture net with an improved bottom design withstanding deformation.

BACKGROUND ART

Aquaculture nets or fish-farming nets are used to raise aquatic life such as fish. The aquaculture net keeps the aquatic life controlled and contained and protects the aquatic life inside the net against predators such as sharks, piranhas, nutrias, seals and sea lions.

The aquaculture nets are usually of the chain link fence type. This is a fence of steel wires woven into a diamond pattern. The meshes have a dimension that is smaller than the dimension of the fish contained in the nets. Each steel wire is pre-formed by bending so that it exhibits a wavy pattern with maxima and minima. The maxima of a steel wire interlock with the minima of a neighboring wire to form the patterns of a series of diamonds.

Aquaculture nets of the chain link fence type have proven to be successful to control the aquatic life and to protect against predators.

The dimensions of such an aquaculture net are considerable. An example of a typical dimension is 30 m×30 m×15 m (square) or 50 m×15 m (round), the last dimension being the depth of the net inside the water and the first two dimensions being the width and length of the net at the water surface. As a matter of example, a net made of galvanized steel wire, or a copper nickel cladded wire, and of the above-mentioned dimensions has a weight above 4 metric Tonnes.

Net bottoms only are usually heavier than 1000 kg. With these high net weights, the bottom has become an important issue since it changes shape under the weight. A flat bottom sinks and gets bent downwards (FIG. 1a). As a result, the walls are also pulled downwards and the net shape is not optimal anymore with a great loss of useful volume. Additionally, the lowest points of the bottom will be at depths greater than 20 meters below sea or ocean level. At these great depths, diving is no longer allowed and divers can no longer reach the bottom of the net. So for divers to reach the bottom of the aquaculture nets, these nets need to be less deep, resulting again in less net volume. This is a great disadvantage.

JP52-122597A discloses a metal net with a hexagonal bottom, wherein the hexagonal bottom thereof is composed of six equilateral triangle. US2010/0319625A1 discloses an aquaculture net with a regular octagonal bottom. The bottom thereof can be formed by a single piece of steel wire mesh. Alternatively, the bottom is formed by either eight parts in the form of equilateral triangles or by four parts in the form of equilateral triangles and by a cross of five square parts. Although the bottom of the aquaculture nets in these publications comprises several parts, the sag of bottom is not addressed and it is still a problem.

To solve this problem ropes are attached to several points of the bottom net and tied to a floatable structure or buoys that prevent the bottom from deforming (FIG. 1b). However, this results in a bottom net with smaller and multiple sags as deepest points. So the dead fish are collected in various sags rather than in one point or according to one single line. This generates extra work for the divers cleaning up the dead fish and makes it difficult to use with automatic dead fish extractors.

Since divers are no longer an option with big dimension aquaculture nets, other solutions are needed.

DISCLOSURE OF INVENTION

It is an object of the invention to avoid the disadvantages of the prior art.

It is a further object of the invention to provide a high volume aquaculture net whereby the bottom of the net remains uniform under the weight of the net.

After careful study, it has been found that a chain link mesh fence has a stiff and a flexible direction (FIG. 2a-b). The stiff direction is the average direction when following one wire in the chain link. This "wire" direction has low deformation since, having particularly regard to the wire diameter, the wire as such normally keeps its rigidity.

The wire has a zigzag-like pattern. Where two adjacent wires of a chain link fence are "hooked" or braided in each other, a flexible movement exists. So in a direction more or less perpendicular to the wire direction, there is a flexible direction.

Since the bottom of an aquaculture net is typically made of a net with a uniform wire direction, i.e. where the wires of all the mesh parts run in one single direction, the hooked wires start to displace first in the flexible direction under the influence of the weight of the mesh and the water movement. This results in a deformation of the bottom net as the net sinks in the water due to its weight.

A specific technical problem is therefore the non-homogeneous load distribution over the bottom surface due to a mesh anisotropy.

The optimal solution to this technical problem is to provide an aquaculture net having where the bottom net has various directions of the wires so that the stiffness or flexibility of the net is not limited to one direction. By alternating or diversifying the mesh direction over the bottom net, a diversified stiffness/flexibility pattern is obtained, and as such a more homogeneous load distribution, preferably uniform in all directions.

For this purpose, a mesh roll is cut into mesh parts or panels. These parts are dimensioned to fill a pattern of specific wire directions or stiffnesses, with the purpose to form the entire bottom net. The mesh parts or panels are connected by means of clips or by means of spiralled wires or rods.

According to a first aspect of the invention, there is provided an aquaculture net having a bottom net and side walls. The bottom net has an outer side forming the circumference of the bottom net. The bottom net is configured of four or more mesh parts of a chain link fence. As explained here above, this chain link fence comprises a stiff wire direction and a flexible direction.

According to the invention, the wire direction of each mesh part forms an angle with the circumference and this angle ranges between 60° and 120°, e.g. between 70° and 110°, e.g. between 80° and 100°. Preferably this angle is about 90°, which means that the wire direction of each mesh part is about perpendicular to the circumference of the bottom net.

The stiff wire direction runs essentially from the centre of the bottom net towards the outer sides.

The flexible direction of some or more of the mesh parts of the bottom net forms an angle between −30° and +30° with the circumference of the bottom net, e.g. and angle between −20° and +20°, e.g. between −10° and +10°, and preferably about 0°.

Some sides of the mesh parts of the bottom net leave wire ends or wire tips. Those sides with wire ends and corresponding with the circumference of the bottom are preferably knotted. Most preferably, all sides with wire ends are knotted.

In case of a pie segment shaped mesh part, e.g. with a circular shaped bottom net, the term "perpendicular to the outer side of a mesh part" means perpendicular to the imaginary straight line running through the intersections of the pie segment with the circumference of the bottom net.

The sides of the mesh parts, corresponding to the circumference of the bottom net, have wire ends which are knotted.

A mesh part preferably has a rectangular, square, triangular, polygonal or pie piece shape. A mesh part may also have a combined shape, such as for example a square base and a triangular tip, forming a pentagonal shape. A pie shape refers to a segment of a circle.

In one embodiment the bottom net comprises four triangular mesh parts forming a square or a rectangle. The wire direction of each mesh part is forming an angle ranging between 60° and 120° with a side of the square or the rectangle. This angle ranges preferably between 70° and 110°, most preferably between 80° and 100° and is about perpendicular to a side of the square or the rectangle. The flexible direction of each mesh part is forming an angle between −30° and +30° with a side of the square or rectangle, preferably an angle between −20° and +20°, most preferably between −10° and +10°, i.e. about parallel. The other sides of each mesh part meet an adjacent mesh part side at the diagonals of the square or rectangle.

In another embodiment the bottom net is octagonal shaped comprising, for example, a first square of four first triangular mesh parts at the center (as described above) and further comprising an outer layer of four second square and four second triangular mesh parts. The second square shaped mesh parts are connected to the sides of the first square. The second triangular shaped mesh parts are connected to the sides of the second square shaped mesh parts.

Alternatively, the bottom is also octagonal shaped and comprises four pentagonal mesh parts and four triangular mesh parts.

In yet another embodiment the bottom net is circular shaped comprising preferably four, six or eight pie shaped mesh parts having a wire.

Adjacent mesh parts are connected by means of mesh joints.

In one embodiment a mesh joint comprises clips for joining the wires of two adjacent mesh parts. In another embodiment a mesh joint may comprise a spiral rod or spool that is inserted in between the loops of two adjacent mesh sides. In yet another embodiment the mesh parts are joined by means of an interwoven rope or wire.

In a preferred embodiment the wire ends at all sides making part of the circumference of the bottom net are knotted, since these sides correspond to the flexible direction of the chain like netting. As such the flexible direction is stiffened by the knotting. Knotting increases the overall strength of the net. Knotting can be done using simple, double and/or spring knots.

The aquaculture net according to the invention is preferably a chain link fence, made of metal wires having a tensile strength higher than 600 MPa. For example, the metal wires may be copper alloy wires or aluminium alloy wires or titanium alloy wires. Steel wires provide an excellent combination of price and strength but are provided with a metal coating of e.g. zinc, zinc alloy, copper alloy. Examples of copper alloys are copper nickel and copper nickel tin.

In case of steel wires the wires have a wire diameter that is smaller than 4.0 mm, e.g. smaller than 3.0 mm.

This aquaculture net may have been treated against biofouling and corrosion, and has dimensions which are greater than 1 m×1 m×1 m (length×width×depth), e.g. greater than 10 m×10 m×10 m.

According to a second aspect of the invention there is provided a method of manufacturing an aquaculture net having an isotropic net bottom as specified above. The method comprising the steps of:

a) cutting one or more chain link mesh parts in a specific shape, b) knotting the open wire tips, c) assembling and joining the chain link mesh parts of step a) and/or b) as to form a bottom shape so that the wire direction of each mesh part is forming an angle with the circumference of the bottom, where the angle ranges between 60° and 120°, preferably between 70° and 110°, most preferably between 80° and 110°, e.g. about perpendicular with the circumference, and d) connecting the bottom to the side walls of the net.

The chain link mesh parts are preferably joined by means of clips or spools.

The chain link mesh parts are usually provided on rolls and are first cut into rectangles.

In one embodiment of the invention, the chain link mesh parts are further cut along the diagonal. Where open wire ends exist after cutting, the cut side is knotted by bending the tip of the open wire end over the wire end of the next wire and by closing the knot.

The aquaculture net of the present invention has multiple advantages: a larger useful lifetime, a better control over the bottom shape, an easier collection of dead fish, a maximum depth within allowed measures, an optimal volume and a uniform load distribution.

A further advantage of the aquaculture net of the present invention is that the individual mesh parts are smaller and easier to transport whereby the net can be easily assembled on location.

BRIEF DESCRIPTION OF DRAWINGS

FIG. 6a illustrates a simple knot;

FIG. 6b illustrates a double knot; and

FIG. 6c illustrates a spring knot.

FIG. 7a spool or spiral rope for joining mesh parts; and

FIG. 7b illustrates a clip for joining mesh parts.

DESCRIPTION OF PREFERRED EMBODIMENTS

Figure 1A:
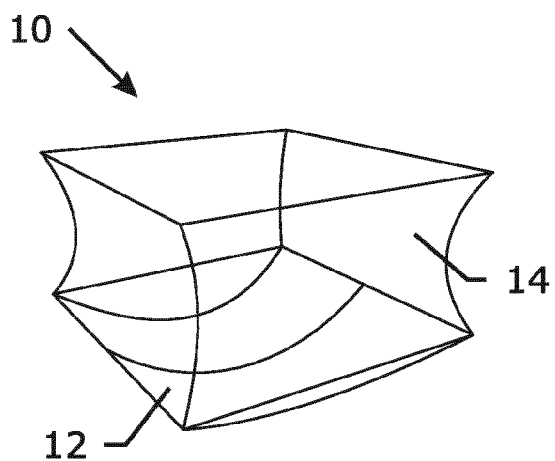
FIG. 1a shows a prior art aquaculture net and FIG. 1b shows a prior art solution to the sunken bottom.

FIG. 1a shows a prior art aquaculture net 10 of square form. The width and length are each 30 m and the intended depth is 15 m. The net is formed of stainless steel wires with a copper nickel alloy coating. Due to the heavy weight of bottom 12, the bottom 12 sinks to depths of 20 m or more and side walls 14 get deformed leading to a reduced net volume of the net 10.

Figure 1B:
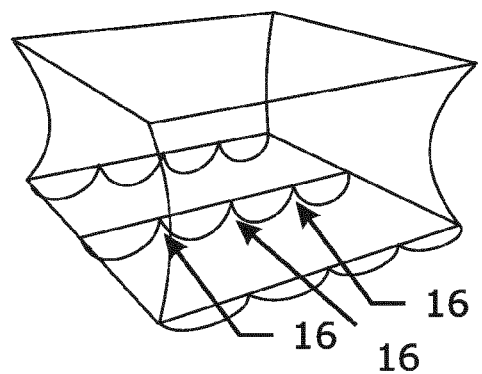

FIG. 1b illustrates a prior art solution for lifting and supporting the sunken bottom net 12. Buoys (not shown) are provided under the bottom net 12 at various spots 16 to lift the bottom net 12. As already mentioned, an immediate disadvantage is that dead fish are collected at various locations between the spots 16.

Figure 2A:
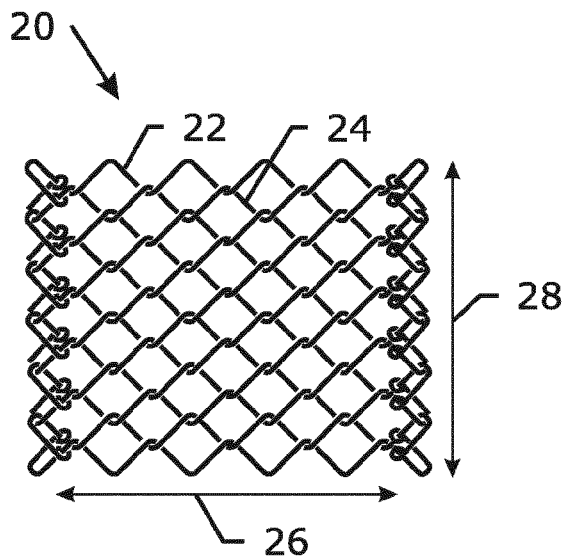
FIG. 2a shows a chain link mesh and FIG. 2b shows a simplified representation of a chain link mesh.
Figure 2B:
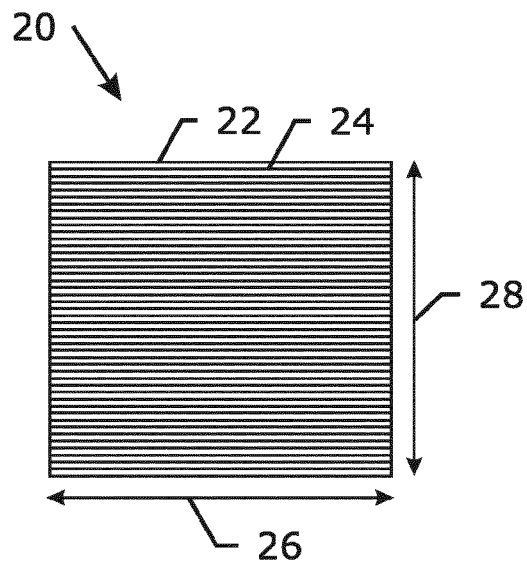

FIG. 2a and FIG. 2b illustrate the origin of the above-mentioned problem of the bottom net.

FIG. 2a shows a chain link mesh 20. This chain link mesh is composed of several wires 22, 24 having a zigzag-like pattern and which are braided into each other. Having regard to the material of the wires, usually steel, and to the diameter of the wires, about 2 to 4 mm, the average direction 26 of the wires 22, 24 is the stiff direction while the direction 28 perpendicular hereto is the flexible direction.

FIG. 2b is now a schematic and simplified illustration of chain link mesh 20. The lines 22, 24 in FIG. 2b indicate the corresponding stiff wire direction 26 of the mesh of FIG. 2a while the flexible direction is perpendicular thereto.

Figure 3A:
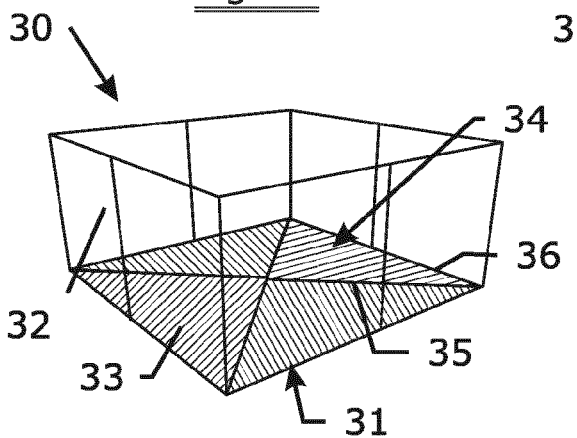
FIG. 3a shows a first embodiment of an aquaculture net according to the invention having

FIG. 3a shows a square embodiment of an aquaculture net 30 according to the invention. The aquaculture net 30 comprises a square bottom net 31 and four side walls 32. The lines 33 in the bottom net 31 represent the stiff orientation of the wires. The bottom net 31 comprises four triangular mesh parts 34 joined at the diagonals 35 to form a square. The wire direction of each mesh part 34 is perpendicular to a side of the square bottom net 31. The flexible direction of each mesh part 34 is parallel to a side 36 of the square.

Figure 3B:
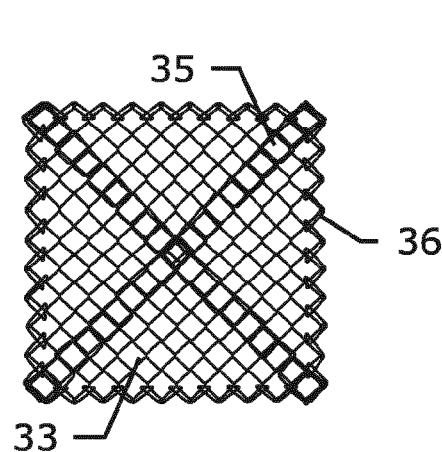
FIG. 3b shows a corresponding bottom net.

FIG. 3b shows a more detailed view of the bottom net 31. All four sides 36 of the square bottom net 31 are knotted for extra stiffness and strength.

Figure 4A:
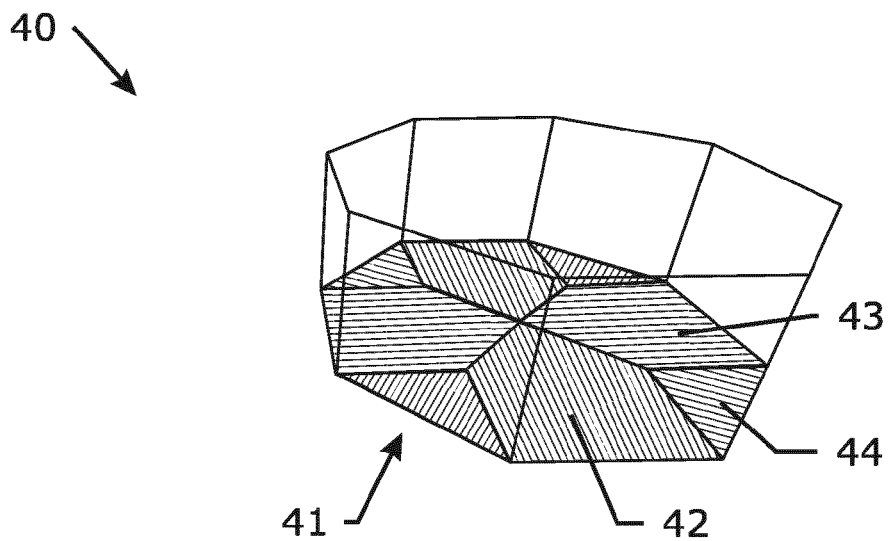
FIG. 4a shows a second embodiment of an aquaculture net according to the invention and FIG. 4b shows a corresponding bottom net.

FIG. 4a shows an octagonal embodiment of an aquaculture net 40 according to the invention. The net 40 has an octagonal bottom net 41. The lines 42 in the bottom net 41 represent the orientation of the wires. The bottom 41 comprises four pentagonal mesh parts 43 and four triangular mesh parts 44. The four mesh parts 43 and the four mesh parts 44 are assembled to form the octagon.

Figure 4B:
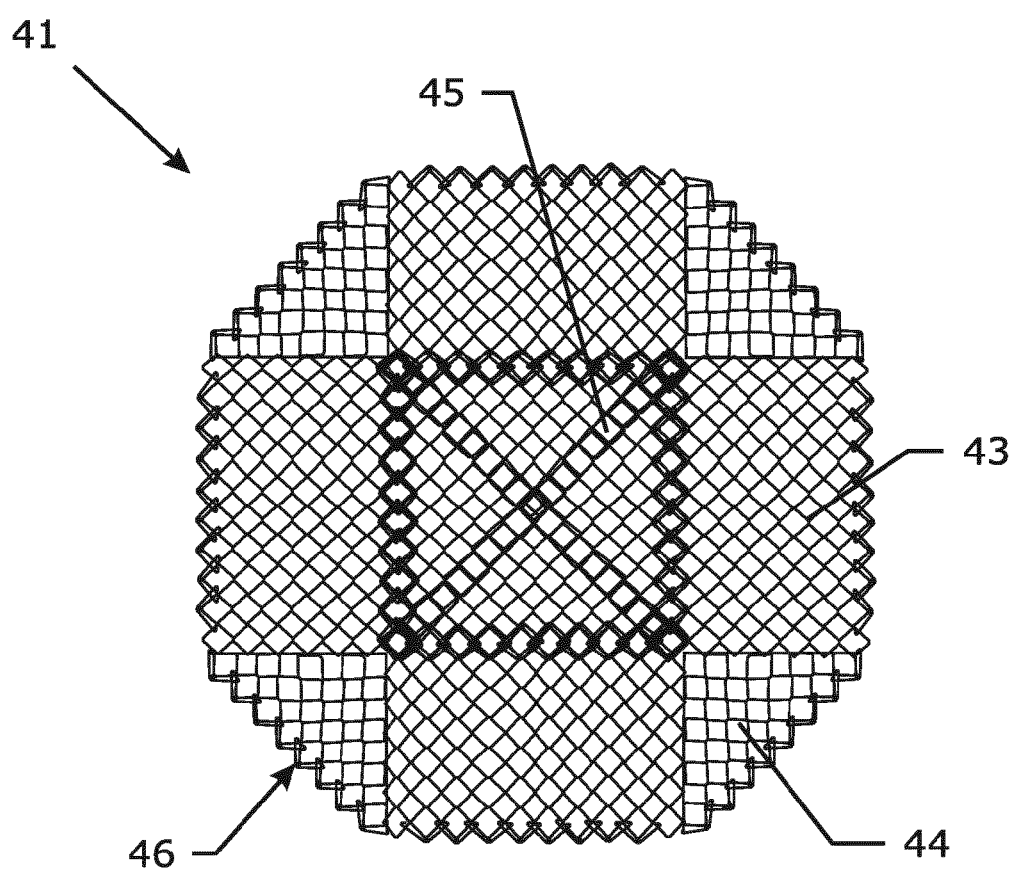

FIG. 4b shows a more detailed view of bottom net 41. The pentagonal mesh parts 43 and the triangular parts 44 are assembled to each other along their adjacent sides 45. All eight outer sides 46 corresponding to the circumference of the bottom net are knotted sides.

Figure 5A:
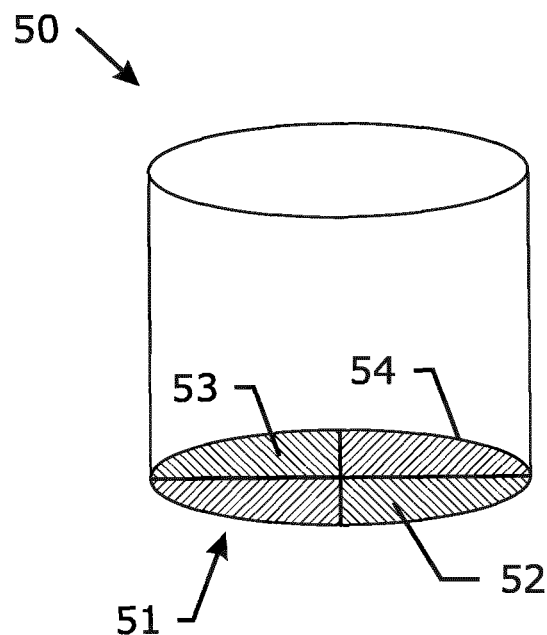
FIG. 5a shows a third embodiment of an aquaculture net according to the invention having and FIG. 5b shows a corresponding bottom net.

FIG. 5a shows a circular embodiment of an aquaculture net 50 having a circular shaped bottom net 51. The lines 52 in the bottom net 51 represent the orientation of the wires. The bottom net 51 comprises four identical pie segments 53 having a wire direction perpendicular to the outer side 54 of each of said pie shaped mesh parts.

Figure 5B:
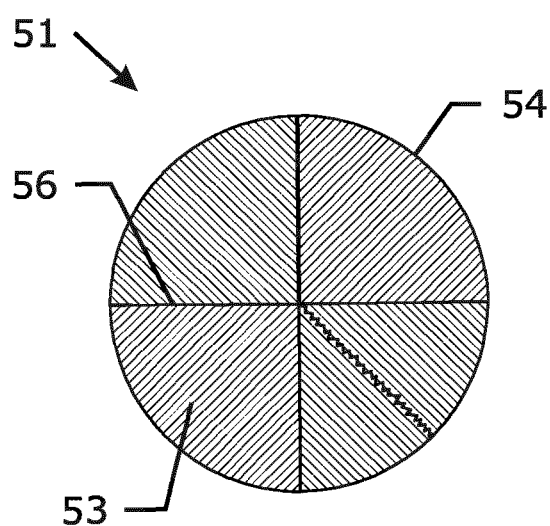

FIG. 5b shows a more detailed view of bottom net 51. All four outer sides 54 corresponding to the circumference of the bottom net are knotted sides. All pie segments 53 have been assembled to each other along their adjacent sides 56.

FIG. 6a, FIG. 6b and FIG. 6c illustrate various knots which may be used at the wire ends.

FIG. 6a illustrates an example of a simple knot 62. The wire end which was cut is knotted by bending the tip of the open wire end over the wire end of a next wire and by closing thus forming a simple knot.

FIG. 6b illustrates a double knot 64. Each wire end is first forming a loop 65 before being knotted to an adjacent wire. In addition, the loops of adjacent wires are entangled. A double knot 64 provides more strength than a simple knot 62.

FIG. 6c illustrates a spring knot 66. Each wire end forms a loop 67 and is knotted with itself. The loops 67 of adjacent wires are entangled.

FIG. 7a and FIG. 7b illustrate means for joining various mesh parts to each other.

FIG. 7a illustrates an example of a spiral rope or rod 72 that may be used to join the sides of two mesh parts. This rope is interwoven between the squares at the sides of adjacent mesh parts.

FIG. 7b illustrates an example of a clip 74 which is used to connect two adjacent mesh parts.

The invention claimed is:

1. An aquaculture net comprising:
   side walls; and
   a bottom net including an outer side forming a circumference of said bottom net, said bottom net comprising four or more mesh parts of a chain link fence,
   wherein said chain link fence includes a wire direction and a flexible direction, the wire direction of each mesh part forming an angle ranging between 60° and 120° with said circumference of said bottom net.

2. The aquaculture net of claim 1, wherein flexible direction of some or more of said mesh parts, forms an angle between −30° and +30° with said circumference of said bottom net.

3. The aquaculture net of claim 1, wherein sides of said mesh parts corresponding to said circumference of said bottom net have wires which are knotted.

4. The aquaculture net of claim 1, wherein said mesh parts have a rectangular, square, triangular, polygonal or pie piece shape or any combination thereof.

5. The aquaculture net of claim 1, wherein said bottom net comprises four triangular mesh parts forming a square or a rectangle.

6. The aquaculture net of claim 5, wherein the wire direction of each mesh part forms an angle with a side of said square or said rectangle, said angle ranging between 60° and 120°, and wherein the other sides of each mesh part meet an adjacent mesh part at diagonals of said square or said rectangle.

7. The aquaculture net of claim 1, wherein said bottom net is octagonal shaped comprising a first center square mesh and an outer layer of four second square mesh parts and four triangular mesh parts.

8. The aquaculture net of claim 1, wherein said bottom is octagonal shaped comprising four pentagonal mesh parts and four triangular mesh parts.

9. The aquaculture net of claim 1, wherein said bottom net is circular shaped comprising four to eight pie shaped mesh parts.

10. The aquaculture net of claim 1, wherein adjacent mesh parts are connected by mesh joints.

11. The aquaculture net of claim 10, wherein said mesh joints comprise clips, a spiral rod, spool, interwoven rope or wire.

12. The aquaculture net of claim 1, wherein said sides are knotted using simple, double or spring knots.

13. The aquaculture net of claim 1, wherein said aquaculture net is made of steel, stainless steel, alloy and/or composite wires, which have a tensile strength higher than 600 MPa.

14. The aquaculture net of claim 1, said aquaculture net having dimensions which are greater than 1 m×1 m×1 m (length×width×depth).

15. The aquaculture net of claim 1, wherein the wire direction is an average direction when following one wire in said chain link fence.

16. The aquaculture net of claim 1, wherein the flexible direction is perpendicular to the wire direction.

17. The aquaculture net of claim 1, wherein the wire direction is an average direction when following one wire in said chain link fence, and the flexible direction is perpendicular to the wire direction.

\* \* \* \* \*